United States Patent [19]
Henson et al.

[11] 3,789,198
[45] Jan. 29, 1974

[54] VEHICLE LOCATION MONITORING SYSTEM
[75] Inventors: Alfred J. Henson; Richard W. Lewis, both of Derby, Kans.
[73] Assignee: The Boeing Company, Seattle, Wash.
[22] Filed: Apr. 10, 1972
[21] Appl. No.: 242,349

[52] U.S. Cl............ 235/150.27, 116/124 R, 340/24, 444/1
[51] Int. Cl..... G06f 15/48, G01c 7/04, G01c 21/10
[58] Field of Search . 73/178 R, 490, 505, 509, 510; 116/35 R, 37, 124 R; 235/61 NN, 61 S, 61 V, 61.5 S, 150.2, 150.27; 340/24; 444/1

[56] References Cited
UNITED STATES PATENTS
3,681,752  8/1972  Cuddihy.............................. 340/24
3,588,478  6/1971  Anthony........................ 235/150.27

Primary Examiner—Felix D. Gruber
Assistant Examiner—R. Stephen Dildine, Jr.
Attorney, Agent, or Firm—Orland M. Christensen; David L. Garrison; Bruce E. O'Connor

[57] ABSTRACT

After a discussion of prior systems for indicating at a central location the instantaneous location of one or more vehicles, such as police cars or taxi cabs, an improved system of this type is described which uses the principles of dead reckoning. The improved system includes a distance sensor, such as a counter storing revolutions of the vehicle's odometer, and a heading sensor, such as a magnetic compass, which are located in a vehicle. A time-multiplex communications system provides for transmission of changes in distance and heading to a central location at periodic intervals. The location of each vehicle is stored in a computer, starting with an initial known position, and periodically updated thereby using the transmitted distance change and heading change information. If desired, the stored vehicle locations may be transmitted to a display unit. To compensate for accumulated errors customary in dead reckoning systems, the computer also periodically compares the stored location of each vehicle against an internally stored matrix corresponding to the known streets, roadways and alleyway of the area. If the vehicle location and road location do not match, the vehicle location is updated to correspond to the nearest street.

18 Claims, 10 Drawing Figures

VEHICLE LOCATION MONITORING SYSTEM

FIELD OF THE INVENTION

This invention generally relates to the field of vehicle location monitoring systems, and, more particularly, to such systems using the principles of dead reckoning.

BACKGROUND OF THE INVENTION

With an ever increasing number of vehicles on the road and with an increase in the number and complexity of roads, there is a demonstrated need for a system or systems which can compile and display information regarding the location of vehicles. With private vehicles, this type of information is particularly useful in co-ordinated traffic control over the area of interest. With public vehicles, such as busses, taxi cabs, fire responding apparatus, and police cars, this type of information is particularly useful not only for vehicle control but also for decreasing the response time of the vehicles in emergency situations and for increasing the efficiency of utilization thereof.

Considering the special case of police cars, the practice in the past has been to assign police cars for operation in predetermined sectors of an area. Communications between each police car and a central dispatching or base station are effected by a two-way radio communications link. Generally, the dispatcher at the base station knows that the police car is within its predetermined sector. To ascertain a more accurate position, the dispatcher must either interrogate the operator of each police car, or the operator must report his position at regular intervals. The difficulty with this approach has been that the police officer in the vehicle is usually preoccupied with matters other than reporting his position. Because this approach depends upon the police officer in the car for reporting, it is inoperative in situations when the police officer is under attack, or engaged in a response to an emergency situation, or is otherwise separated from his vehicle. Even if the police officer were able to accurately and continuously report his position, he could not do so for the data carrying capability of a voice channel is severely restricted, at least when many police cars must use the same frequencies for communication. Although the data carrying capability of voice channels may be increased by use of the well known "ten" codes, location reporting is not easily adaptable to such a code. 45 to the sector. Also, the sector concept may One disadvantage arising from this lack of information regarding police car location has been the response time of a police car to an emergency within a sector. It has been found empirically that the average response time is on the order of five to seven minutes. If the dispatcher had more accurate information about the location of every police vehicle, it is entirely possible that, given the location of a particular emergency, the dispatcher could reduce response time by directing a police car from an adjacent sector into the area because of that police car's closer proximity to the emergency than that of the police car assigned to the sector. Also, the sector concept may be dispensed with and a more dynamic and responsive approach to police car utilization effected.

Some approaches in the prior art to the improving of vehicle location monitoring have been to "automate" the reporting process. In a typical system, a replica of a map of the area is located in the police car and a corresponding replica is located in the dispatcher's base station. The location of the car is reported at the initiation of the police officer by the positioning of an appropriate device on the map replica in the police car. The coordinates of this position are detected by appropriate means and transmitted via a radio channel to the base station, and the coordinate information is reproduced in the form of a marker upon the dispatcher's map replica. If the data in the radio channel is multiplexed to permit sharing of the channel by a plurality of police cars, the efficiency of data transmission is obviously improved. However, this type of system is still subject to the major drawback of the voice reporting method, in that a police officer must initiate the reporting function.

There are systems in the prior art which attempt to automatically detect the location of the police car. These systems may be generally grouped into two types: first, those which measure the location of the police car or cars from the base station; and second, those in which equipment is placed in each police car for determination of its location and transmission to a central base station for compilation and display.

Into the first category fall such systems as automatic direction finding, rader, and Loran. Automatic direction finding is difficult to apply to the automatic detection of a large number of vehicles such as police cars. Radar is subject to errors and loss of location information resulting from ground clutter and false returns, especially in large metropolitan areas where the number of reflecting objects, such as buildings, are present. The Loran approach appears more promising, but the errors that are inherent in the technique appear to defeat its use for large metropolitan areas. In one embodiment, the technique depends for its successful implementation upon the determination of the time necessary for an rf signal to propagate from a plurality of fixed locations to the patrol car. These times are dependent upon the propagation conditions in the area. Where multi-path propagation is possible, as in a large metropolitan area, detection of the transmitted Loran signals is difficult. As a result, the accuracy of a Loran system appears limited, with a typical figure being plus or minus 500 feet 95 percent of the time. In many cities, location information must be known to within 100 feet or less.

Generally, systems in the second category use the principle of dead reckoning for determination of location. In dead reckoning, an initial position of the car is determined and transmitted to the central or base station. This determination may be made either manually by the police officer or automatically by a signalling device located at a convenient location, such as the police garage, which causes a code to be transmitted to the central location when the vehicle passes in the vicinity of the signalling device. Once the initial position of the car is known, the instantaneous location thereof at some later point in time can be computed by knowing the distance the car has travelled and any direction or heading changes that have occurred between the time the vehicle passed the initial position and the time of measurement.

The difficulty with prior systems using the principle of dead reckoning is that distance and heading errors arising from the distance and heading sensors accumulated with time, so that the total locational error continues to increase. Errors also arise from the fact that continuous reporting of vehicle distance travelled and heading directon cannot be made if more than one vehicle is to use the same communications channel. In order for a dead reckoning system to be accurate, the location information must be continuously corrected. The prior art systems have been disadvantageous in this process of correction. For example, a plurality of check points may be established within the area of operation. A stationary transmitter or other device at the check point then causes the vehicle's communications system to transmit a known location code when it passes in the vicinity of the check point. The expense of installing transmitters or other devices at a number of locations within the area appears to be a major disadvantage. If a police car were unable to go past a check point in an emergency, critical information as to its location would be lost at a period of time when this information is most needed.

Therefore, it is an object of this invention to provide a vehicle location monitoring system in which the location of one or more vehicles in a given geographical area is made available at a central location for compilation and display purposes.

It is another object of this invention to provide such a vehicle location monitoring system in which information as to the location of a plurality of vehicles in an area is made available on an instantaneous basis with a degree of accuracy sufficient to allow use of the system in a congested metropolitan area.

It is yet another object of this invention to provide such a vehicle location monitoring system in which computation of vehicle location is made by applying the principle of dead reckoning to information including an initial vehicle position, and instantaneous distance travelled and heading changes made.

It is a further object of this invention to provide such a vehicle location monitoring system using the principle of dead reckoning for computation of vehicle location, in which accumulated errors common in dead reckoning systems are compensated for without the necessity of recalibration stations or check points located in the area.

SUMMARY OF THE INVENTION

These objects and others which will be realized from a consideration of the following specification are achieved, in one embodiment, by a distance sensor providing an output signal for every predetermined increment of vehicle travel, a heading sensor providing an output signal proportional to the vehicle heading, a first storage means containing the coordinates of the vehicle's last-known location in a predetermined area, and computing means for periodically computing new vehicle location coordinates from the output signals of the distance and heading sensors and the last-known location, and for replacing the last-known location with the new vehicle location. A second storage means contains the coordinates of drivable surfaces in the area. A comparator provides an ottput signal if the coordinates in said first storage means do not correspond to any coordinates in the second storage means, and an update means is responsive to the comparator output signal to change the coordinates in said first storage means to correspond with those in said second storage means of the nearest drivable surface.

In another embodiment, the invention resides in a method for continuously monitoring the location of a vehicle within a predetermined area, in which a last-known location of the vehicle is stored in terms of coordinates $X_{old}$, $Y_{old}$. An incremental distance $\Delta D$ travelled by the vehicle from the last-known location is measured, and the heading angle of the vehicle's travel is also measured. A new location is periodically computed for the vehicle in terms of coordinates $X_{new}$, $Y_{new}$ according to relations $X_{new} = X_{old} + \Delta D[\cos(\text{heading})]$ and $Y_{new} = Y_{old} + \Delta D[\sin(\text{heading})]$. The coordinates $X_{new}$, $Y_{new}$ are then stored as the coordinates $X_{old}$, $Y_{old}$ for subsequent computations.

To compensate for cumulative errors, the coordinates $X_{old}$, $Y_{old}$ may be compared with a table of coordinate values $X_{st}$, $Y_{st}$ corresponding to the drivable surfaces in the area. A criterion for error correction is that the vehicle remain on a drivable surface. Therefore, if the coordinates $X_{old}$, $Y_{old}$ do not correspond to any coordinates $X_{st}$, $Y_{st}$ in the table, the table is searched to find coordinates $X_{st'}$, $Y_{st'}$ which are nearest to $X_{old}$ and $Y_{old}$. Then, the coordinates $X_{st'}$, $Y_{st'}$ may be stored as the coordinates $X_{old}$, $Y_{old}$ and the monitoring process continued.

The invention is also embodied in a vehicle location monitoring system for determining at a central station the locations of a plurality of vehicles within a predetermined area. This system includes a plurality of mobile units, one being associated with each vehicle and each including a distance sensor and a heading sensor. A multiplexed communications system provides for transmission of distance sensor and heading sensor output signals from each of the mobile units to a central station. At the central station, the distance and heading sensor output signals are temporarily stored. A first means stores the last-known location for each of the vehicles. A computing means periodically computes a new location for each of the vehicles and stores the new location in the first storage means. This computing means operates upon the last-known location for each vehicle, and the distance and heading inforamtion contained in the distance and heading sensor output signals.

To correct for cumulative errors, a second storage means is provided at the central station which stores the locations of drivable surfaces in the area. Means are provided for comparing the location of each vehicle in the first storage means with the locations of drivable surfaces in the second storage means. An output is provided when the location of any vehicle does not correspond to any location in the second storage means. Upon occurrence of this output signal, updating means changes the vehicle location in the first storage means to correspond to the location of the nearest drivable surface contained in the second storage means.

BRIEF DESCRIPTION OF THE DRAWINGS

The invention can perhaps best be understood by reference to the following portion of the specification, taken in conjunction with the accompanying drawings, in which.

BRIEF DESCRIPTION OF A PREFERRED EMBODIMENT

Before investigating a preferred embodiment of the invention, it would seem appropriate to review how location can be determined using the principles of dead reckoning.

First, the initial location of the observer must be known with an accuracy sufficient for that of the determination. Second, when the observer travels from that initial location, the distance that he travels and the heading of his travel must be measured. Heading is typically defined as the angle of travel with respect to the earth's north-south axis. In the special case of a metropolitan area, heading may be arbitrarily defined as the angle of travel with respect to a Y-axis established for the area, which may or which may not correspond with the earth's magnetic axis. Conveniently, the Y-axis may be arbitrarily defined to coincide with a vertical axis of a map of the geographical area under consideration and the X-axis arbitrarily chosen to be perpendicular thereto.

Then, if the initial location of the observer is defined in terms of coordinates $X_{old} = X_0$, $Y_{old} = Y_0$, the location of the observer after his travel in terms of coordinates $X_{new}$, $Y_{new}$ can be calculated as follows:

EQUATION I $$X_{new} = X_{old} + \Delta D[\cos(\text{heading})]$$

EQUATION II $$Y_{new} = Y_{old} + \Delta D[\sin(\text{heading})],$$

where $\Delta D$ = the incremental distance travelled at a given heading.

Errors in the determination of the observer's new location may arise from a number of sources. First, the distance and heading measurements are made with some error. Although these errors may well be within a prescribed accuracy for the first determination of location, they generally accumulate as the second and succeeding location determinations are made by using the previously determined coordinates $X_{new}$, $Y_{new}$ as coordinates $X_{old}$, $Y_{old}$ in equations I and II. That is, the errors made in the first determination are added to those made in the second, the total errors in the second to those in the third, and so forth, so that the total location error after a given travel of the observer exceeds the prescribed accuracy. Second, equations I and II are valid only if the distance travelled $\Delta D$ is at a constant heading. In practice, the heading of the observer continuously varies in small amounts and occasionally in large amounts. If the calculations as described above are not made for every change of heading, an additional error is introduced which is also cumulative.

When the principle of dead reckoning is used to determine and report the position of a plurality of vehicles in a vehicle location monitoring system, errors of the second type described above are likely to increase because each vehicle cannot be continuously in communication with a single base station.

An improved vehicle location monitoring system for compensating for the aforesaid errors and providing reliable and continuous location reporting will now be described.

Figure 1:
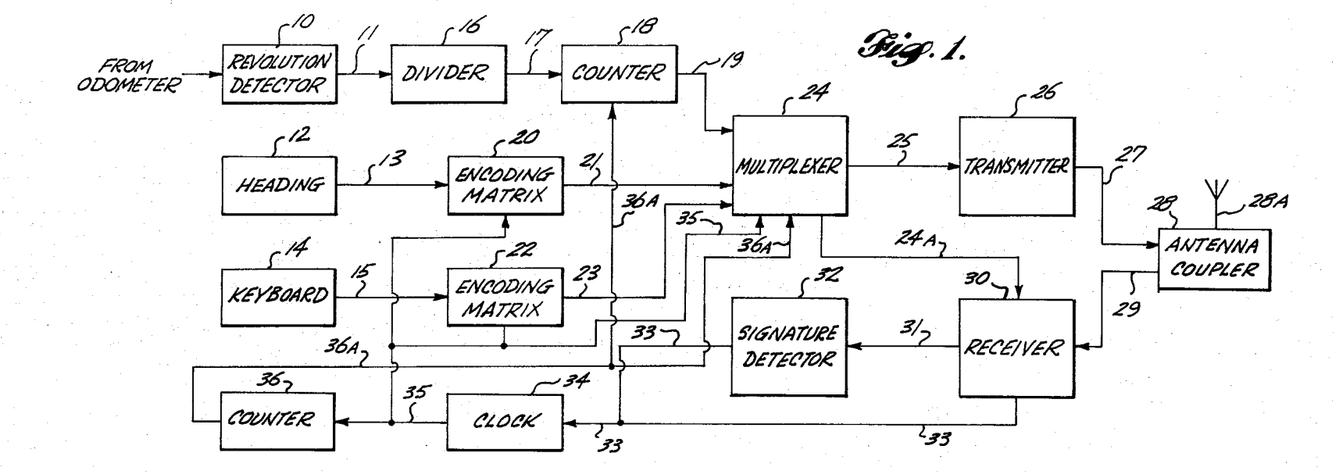
FIG. 1 is a block diagram of a mobile unit of the vehicle location monitoring system.

In FIG. 1, distance measurements are provided by revolution detector 10 which receives its input from a rotational mechanism of the vehicle which rotates in response to vehicle movement, for example, the vehicle's odometer cable or its drive shaft.

Figure 8:
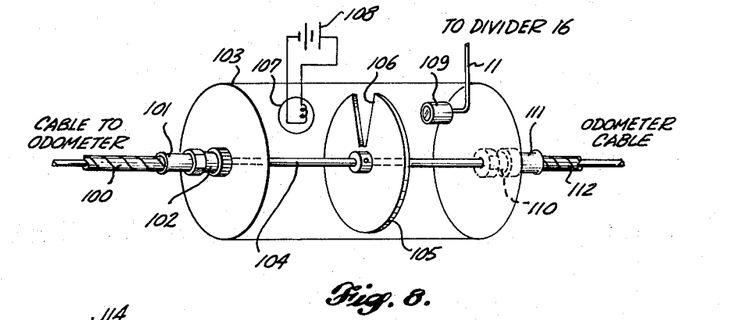
FIG. 8 is a pictorial diagram illustrating a typical distance sensor for use with the invention.

Referring now to FIG. 8, an embodiment of the revolution detector 10 for sensing revolutions of the vehicle's odometer cable includes a housing 103 having an input cable connector 102. A cable 100 from the vehicle's differential or transmission for the vehicle's odometer is coupled to a connector 102 by a cable connector 101. Accordingly, a shaft 104 rotates with a detector in response to vehicle movement. Shaft 104 supports thereon a chopper disc 105 having a slit 106. A light source 107 which is energized from a DC battery 108 is disposed on one side of the chopper disc 105, and a photoelectric detector 109 is disposed on the other side and provides an output pulse on a line 11 for every revolution of the shaft 104. The output revolution connection to the vehicle's odometer is completed by a connector 110, a cable connector 111, and an odometer cable 112.

Figure 8A:
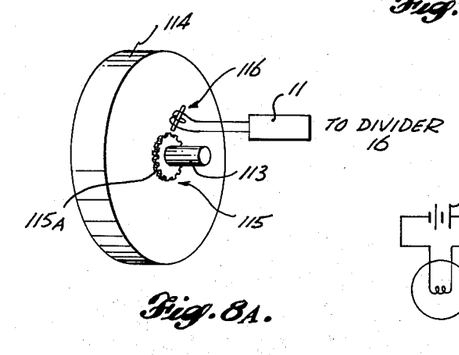
FIG. 8A is a pictorial diagram illustrating a preferred distance sensor.

A preferred embodiment of the revolution detector 10 which is not subject to errors arising from wheel spinning when the vehicle is stuck or driven on a slick street is seen in FIG. 8A. A stationary shaft 113, such as a vehicle's front axle, supports for rotation an undriven and freely rotating wheel 114, which may correspond to a front wheel of most American vehicles. A disc 115 is connected to and rotatable on shaft 113 with wheel 114 and includes a plurality of evenly spaced tooth-like projections 115A around its circumference. Preferably, disc 115 is of a magnetically permeable material so that the projections 115A interact with an adjacent, fixed magnetic sensor 116 to produce an output pulse on line 11 for every passage of a projection 115A.

Each pulse appearing on line 11 corresponds to a predetermined increment of vehicle travel. The pulses are counted down by a divider 16 so that the output pulses therefrom on a line 17 correspond to larger increments of vehicle travel sufficient for system accuracy. For example, the pulses on line 17 may be provided for every 44 feet of vehicle travel. These pulses are accumulated in a resettable counter 18 which provides an output on line 19 in a manner to be described hereinafter. In the embodiment described, counter 18 may comprise a two-stage counter which is reset by a pulse appearing on a line 36A.

Figure 9:
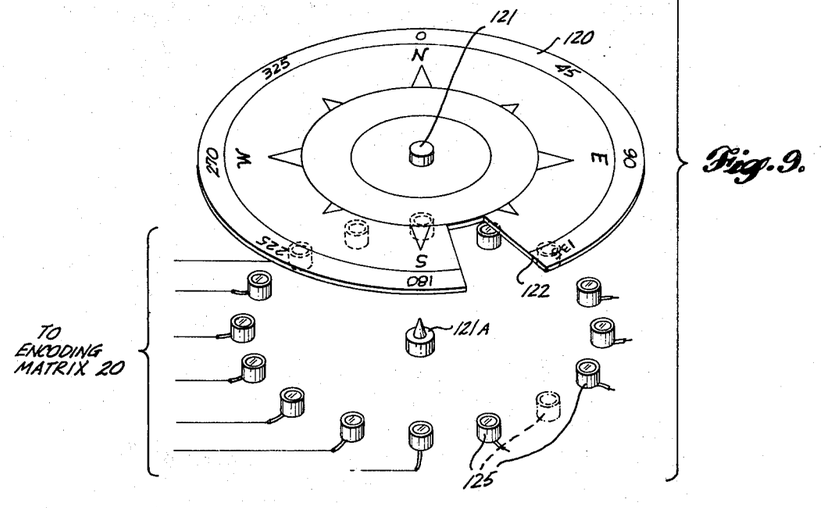
FIG. 9 is a pictorial diagram illustrating a typical heading sensor for use with the invention.

Heading measurements are made from the output of a heading detector 12 which includes a compass or other direction-sensitive element mounted on the vehicle. For example, a flux gate or magnetic compass may be used. One embodiment of heading detector 12 is seen in FIG. 9 and includes a compass card 120 which is supported on pivots 121, 121A for rotation with the earth's magnetic field. A light source 123 which is powered from a DC battery 124 is positioned immediately above compass card 120. A sector 122 is removed from card 120, allowing light transmission to certain ones of a plurality of photoelectric elements 125 which are arranged about the circumference of card 120. The angles between the photoelectric elements 125 are all equal and each angle is in turn equal to the included angle of sector 122. Therefore, output signals are provided from those of photoelectric elements 125 which are actuated from light source 123 through sector 122. The output signals indicate the relative orientation of the vehicle with respect to the earth's magnetic axis.

The output lines from photoelectric elements 125, collectively designated 13 in FIG. 1, are coupled to the input of an encoding matrix 20 which may be of any type known to the prior art for converting the output signals thereon into an output pulse or pulse train under control of clock pulses on a line 35.

For example the inclued angle of sector 122 may be 22.5 degrees with the angle of separation between photoelectric elements 125 also being 22.5 degrees, and with sixteen photoelectric elements 125 being provided.

The vehicle location monitoring system may also include provision for transmission of the well-known "ten" codes. To this end the system includes a keyboard 14 which may include at least ten push-button switches, not illustrated, for allowing an operator to enter the appropriate code in digit form. The output lines of the switches in keyboard 14, collectively designated 15 in FIG. 1, are coupled to an encoding matrix 22 which is of a type for providing a pulse output corresponding to the selected code under control of clock pulses on line 35. For example, the signals on line 23 may be in the well-known binary coded decimal (BCD) code.

Lines 19, 21 and 23 are connected to the input of a multiplexer 24 which provides an output pulse train on line 25 embodying distance, heading and "ten" code information at a time controlled by a gating signal obtained on a line 36A, to be described hereinafter. The pulse train signal on line 25 is modulated onto an appropriate rf carrier in an rf transmitter 26. The rf signal appears on line 27 and is coupled to an antenna 28A by an antenna coupler 28.

Figure 2:
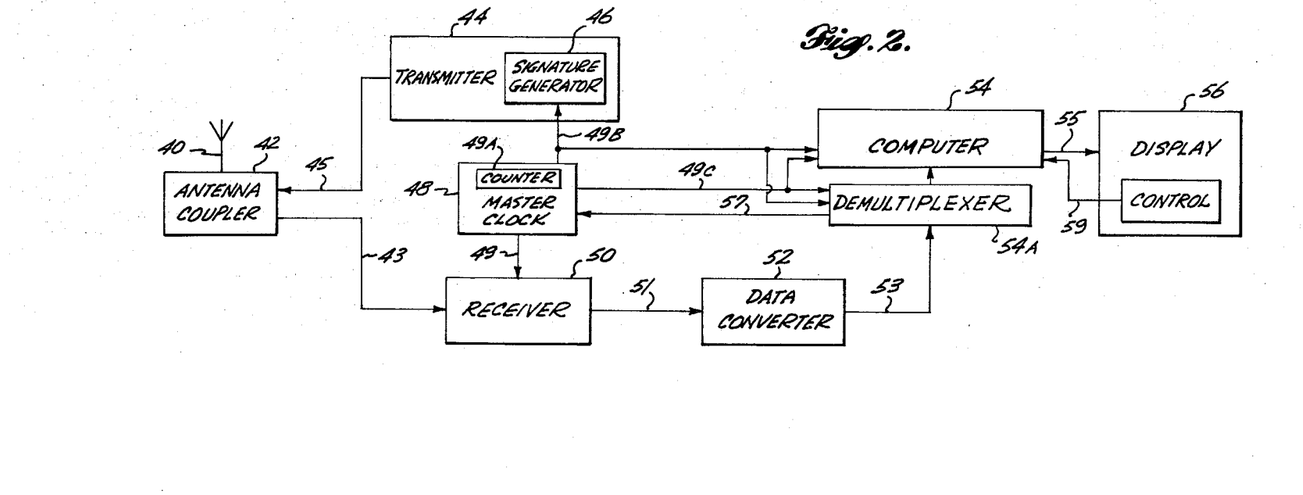
FIG. 2 is a block diagram of a base station unit of the system.

With particular reference now to FIG. 2 illustrating the portions of the system located at a base station, the transmitted rf signal is received by an antenna 40 and coupled through an antenna coupler 42 and a line 43 to the input of a receiver 50. The rf carrier is removed in receiver 50 and the modulated pulse train is provided via an output line 51 to a data converter 52, which converts the pulse train into a format suitable for a digital computer 54. The converted data is transmitted on line 53 to a demultiplexer 54A, where it is demultiplexed, and then applied to a portion of a computer 54 operating under control of a program more fully decribed hereinafter.

To control the transmission of data from a plurality of vehicles, each including a system similar to that illustrated in FIG. 1, the computer 54 cooperates with a master clock 48 and demultiplexer 54A to establish a time-multiplexed system operation. Master clock 48 provides a plurality of clock pulses on a line 49C to computer 54 and demultiplexer 54A to establish a system time base. Included in master clock 48 is a counter 49A which counts the clock pulses and provides an output sync pulse of predetermined duration on a line 49B for every predetermined number of clock pulses. The sync pulse is used to establish a reporting cycle for the system and a typical rate thereof may be 1 Hz. Master clock 48 also includes circuitry, not illustrated, for developing an enable pulse from the sync pulse which is provided on a line 49 to the receiver 50 for controlling the operation thereof.

Each sync pulse on line 49B is applied to computer 54 and demultiplexer 54A for synchronizing, demultiplexing and reading operations, and to a signature generator 46 which is included in an rf transmitter 44. The transmitter's rf signal output is coupled via line 45 and antenna coupler 42 to antenna 40. The signature generator 46 may comprise an oscillator providing a series of low frequency pulses for the duration of the sync pulse on line 49B. These pulses, or the "signature," are modulated onto an rf carrier by transmitter 44 and transmitted to each of the mobile units of the system. The signature pulses are used to synchronize the time-multiplexing operations of the mobile units with that of the base station unit illustrated in FIG. 2.

Referring back now to FIG. 1, rf signals which are received by antenna 28A are coupled through antenna coupler 28 and a line 29 to the input of an rf receiver 30. The rf carrier is removed in receiver 30 and the demodulated output appears on a line 31. A signature detector 32 detects low frequency signature pulses on line 31 and provides a sync pulse on a line 33 which controls receiver 30 and which additionally enables and synchronizes a local clock 34. The clock pulses from local clock 34 control the development of data signals and the time multiplexing of those data signals in the mobile unit. Preferably, the repetition rate of the clock pulses is identical to that of master clock 48.

Line 35 is connected to encoding matrix 20, encoding matrix 22, multiplexer 24, and a counter 36. An output pulse is provided by counter 36 on a line 36A for every predetermined number of clock pulses on line 35. Counter 36 is designed so that one output pulse is in every reporting cycle. Finally, receiver 30 is additionally controlled by a control pulse provided by multiplexer 24 on a line 24A.

Figure 3:
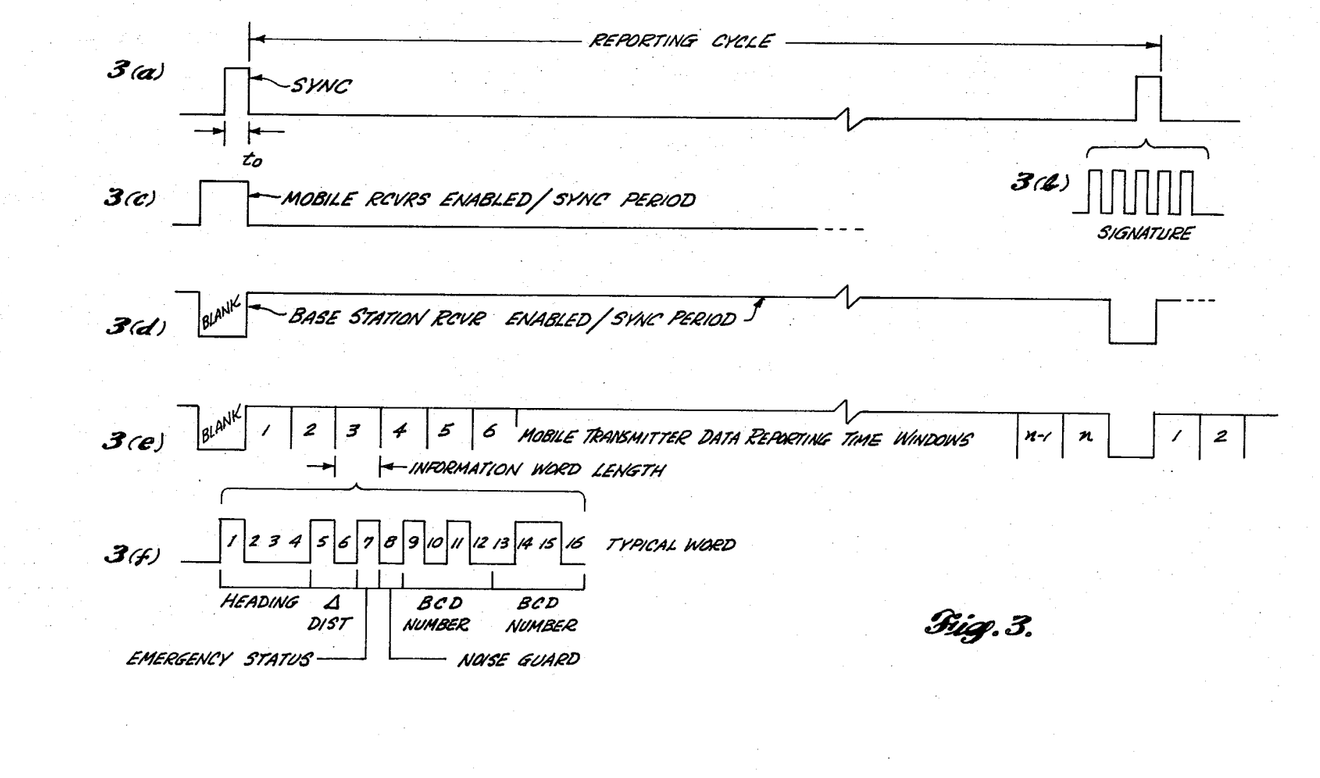
FIG. 3 is timing diagram illustrating how the system time-multiplexes vehicle location and other information.

Additional structural details and operational features can be understood by considering FIGS. 1 and 2 in conjunction with the timing diagram illustrated in FIG. 3.

Assume that master clock 48 is running and that counter 49A therein is initially reset. At the end of a predetermined number of clock pulses, counter 49A provides an output to develop the sync pulse, seen in waveform 3(a), on line 49B. The leading edge of the sync pulse enables the signature generator 46 which provides a low frequency pulse train until disabled at the trailing edge of the sync pulse, as seen in waveform 3(b). For example, the signature may comprise five output pulses at a 1 KHz rate.

The trailing edge of the sync pulse also resets a counter and logic means, not shown, within demultiplexer 54A and is used by circuitry within master clock 48, not illustrated, to develop the enable pulse on line 49 which turns base station receiver 50 on, as best seen in waveform 3(d), for reception of multiplexed data from the plurality of mobile units used in the system. After resetting by the sync pulse, the counter and logic means within demultiplexer 54A provides a set of output signals from the clock pulses on line 49C which establish successive reporting intervals or "time windows" within each reporting cycle for recognizing the data transmitted from each of n mobile units during its assigned reporting interval, as best seen in waveform 3(e). For example, each interval may be 5 ms long. The computer 54 is programmed to transfer the received and demultiplexed data to storage positions corresponding to each mobile unit. At the completion of the nth reporting interval, the demultiplexer 54A transmits a reset pulse on line 57 to master clock 48 which in turn resets the counter 49A. At this time, the enable pulse is removed from line 49 so that receiver 50 is temporarily disabled. Shortly thereafter, counter 49A again produces the sync pulse on line 49B to repeat the reporting cycle.

Let it be assumed that the receiver 30 in a particular mobile unit is turned on. When the signature pulses appear on line 31, the signature detector 32 provides the output sync pulse on line 33 which is similar to the base station sync pulse illustrated in waveform 3(a). The trailing edge of this sync pulse starts local clock 34 and disables receiver 30, as seen in waveform 3(c). The clock pulses on line 35 are used to develop output signals on lines 21 and 23, which output signals correspond to the instantaneous heading of the vehicle and a desired "ten" code, if any.

After a predetermined number of the clock pulses on line 35, counter 36 provides an output pulse on line 36A whose leading edge denotes the beginning of a particular reporting interval assigned to the mobile unit. The mobile unit's reporting interval substantially coincides with one of the base station's reporting intervals because of synchronization effected by the signature pulses. In response to the clock pulses on line 35 and the pulse on line 36A, multiplexer 24 develops the output pulse train or information word on line 25 from the output signals present on lines 19, 21 and 23. An example of a typical pulse train is seen in waveform 3(f), and comprises the serial transmission of heading, $\Delta D$, emergency status, noise guard, and two BCD numbers corresponding to a desired "ten" code.

It should be noted that only two bit positions in the pulse train are required for the $\Delta D$ data. If the reporting cycle frequency is 1 Hz, and reporting is made once per cycle, then data transmission occurs at one-second intervals. Assuming that an output pulse is provided on line 17 from divider 16 for every 44 feet of vehicle travel, then counter 18 contains a 00 if the vehicle is stationary or travelling slower than 44 feet per second during the reporting cycle, a 01 if the vehicle is moving faster than 44 feet per second, a 10 if the vehicle is moving faster than 88 feet per second, or a 11 if the vehicle is moving faster than 132 feet per second and slower than 176 feet per second. Therefore, with a two-bit code, vehicle speeds up to 176 feet per second, or 120 mph, can be accommodated.

At the trailing edge of the pulse on line 36A, counter 18 is reset to accumulate pulses on line 17 during the next reporting cycle.

At the termination of the nth reporting interval, multiplexer 24 provides a control pulse on line 24A to enable receiver 30 for reception of signature pulses to start a new reporting cycle.

When the data from a plurality of vehicle units are received at the base station, the data converter 52 changes the data format from serial to parallel for operation upon by computer 54. The data is then demultiplexed by demultiplexer 54A as described previously and transferred to appropriate storage positions within computer 54.

The "ten" code data may be transferred to an appropriate display, not illustrated, which forms no part of the present invention. To calculate vehicle location from the heading and $\Delta D$ data and to correct those calculations for cumulative errors, the computer 54 is controlled by a program whose flow chart may be seen in FIG. 4.

Figure 4:
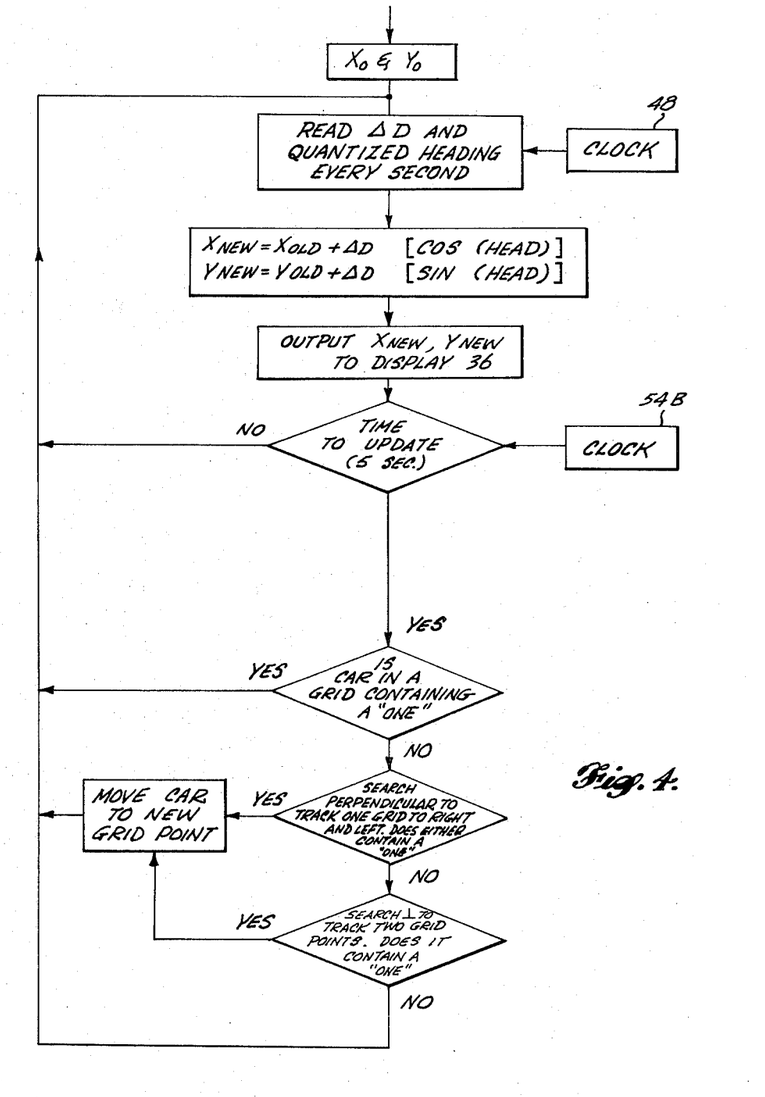
FIG. 4 is a flow chart illustrating a computer program for controlling a digital computer in the system on-line to determine the locations of the system's mobile units and to update locations to compensate for accumulated errors.

A first memory array is established within computer 54 for storing the calculated $X$ and $Y$ coordinates of each mobile unit in the system. The initial location having coordinates $X_0, Y_0$ of each vehicle is entered into this first array when the vehicle is about to leave a known position, such as the police garage. During each reporting cycle, the $\Delta D$ and heading data for the mobile units is entered into computer 54 under control of master clock 48A as aforesaid.

The $X$ and $Y$ coordinates in the first memory array are then changed for each mobile unit, preferably once a reporting cycle, by computing new coordinates $X_{new}$, $Y_{new}$ according to equations I and II previously described, using the previous $X$ and $Y$ coordinates in the first memory array, and the $\Delta D$ and heading values for each mobile unit, and storing $X_{new}, Y_{new}$ in the first memory array.

The coordinates $X_{new}, Y_{new}$ may be transmitted by the computer 54 on line 55 to a display 56 which forms no part of the present invention but which may comprise a cathode ray tube for indicating instantaneous vehicle location on a map overlay. A control section 58 within display 56 provides signals on line 59 for determining whether all or selected vehicle locations will be displayed.

In order to correct for cumulative errors, a clock 54B internal to computer 54 gates on an update subroutine at regular intervals, on the order of every 5 seconds. Clock 54B may be asynchronous with master clock 48. Location correction in the update subroutine is based on a comparison of the calculated vehicle location contained in the first memory array with location information in terms of coordinates $X_{st}, Y_{st}$ located in a second memory array within computer 54 which corresponds to an area's known drivable surfaces, including streets, roadways and alleyways. For example, a map of a metropolitan area may be overlaid with a grid network having regularly spaced grid increments, with the $X$ and $Y$ axes being identical to those used for location reporting. The $X$ and $Y$ coordinates of each grid intersection are assigned to specific positions in the second memory array. If the grid intersection coincides with a street, roadway or alleyway, a logic 1 is stored at the position in the second memory array corresponding to the $X$–$Y$ coordinates of the grid intersection. If the grid intersection does not overlay a street, roadway, or alleyway, a logic 0 is stored in the corresponding second memory array position.

Figure 5:
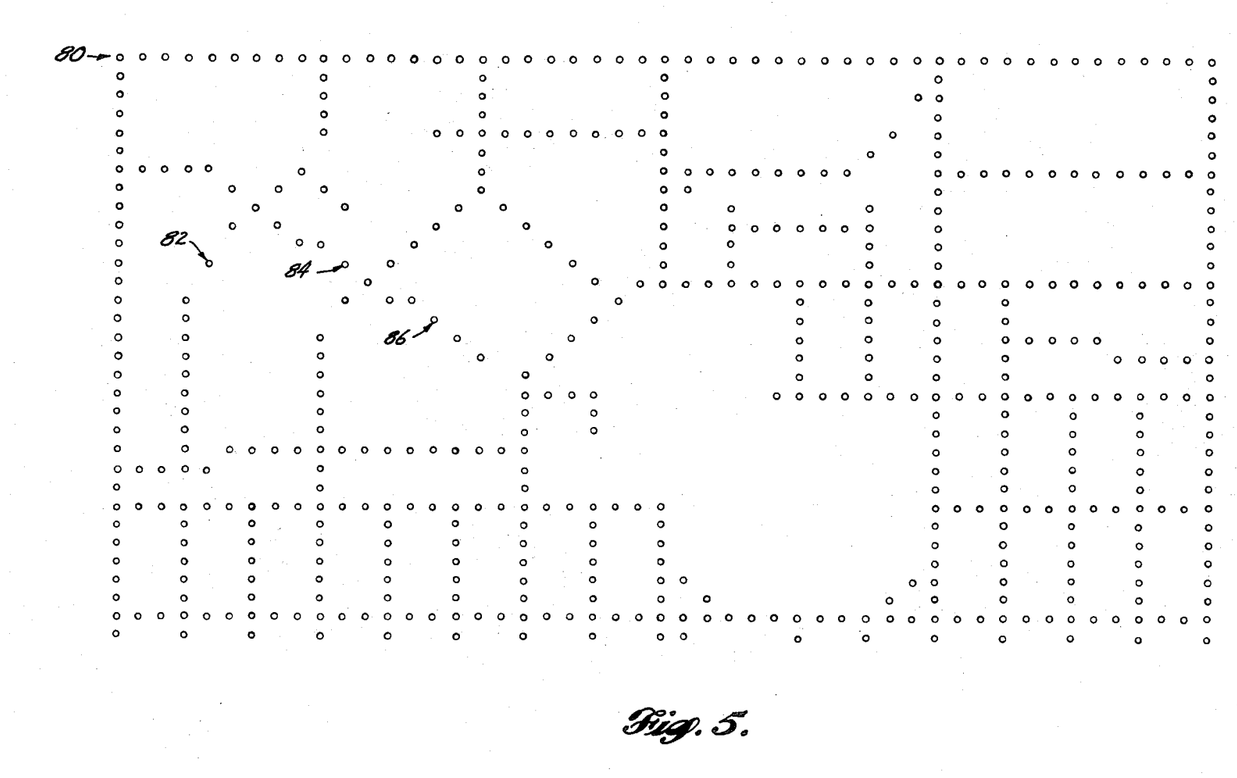
FIG. 5 is a reproduction of a computer printout illustrating a computer-stored matrix corresponding to the known street, roadways and alleyways of a typical metropolitan area.

A simulated computer printout of the information stored in the second memory array for a portion of a given metropolitan area is illustrated in FIG. 5, where the dots correspond to logic 1's and the blank spaces correspond to logic 0's of the array. The portion illustrated in FIG. 5 corresponds to the upper portion of the map reproduction in FIGS. 6 and 7, including the area between streets 80 and 82. It will be noted that at 84 and 86, for example, the position of the street has been shifted in the second array to correspond with actual grid intersections, as the grid network cannot readily accommodate drivable surfaces consistently running at an angle other than parallel to grid lines or at 45° with respect thereto, and still maintain required accuracy. At 88, for example, the curved street is represented in the second memory array only at every other grid intersection.

Correction for cumulative errors is made by requiring the vehicle to remain on a drivable surface whose location $X_{st}, Y_{st}$ is stored in the second memory array, and by moving the reported location $X_{old}, Y_{old}$ of a vehicle to an adjacent drivable surface $X_{st'}, Y_{st'}$, if the two locations do not coincide.

First, the second memory array is interrogated at the position therein corresponding to the last reported $X$ and $Y$ coordinates $X_{old}, Y_{old}$ of the vehicle. If that array position contains a logic 1, the vehicle location is defined to correspond to a known drivable surface, and no correction is made.

If, however, that array position does not contain a logic 1, the positions in the second memory array perpendicular to the vehicle's heading and immediately adjacent the previously interrogated array position are interrogated. If either of these array positions contain a logic 1, the $X-Y$ coordinates $X_{old}, Y_{old}$ in the first memory array are changed to correspond to those $X_{st'}, Y_{st'}$ of either new position in the second memory array and the vehicle location is defined to correspond to a known drivable surface.

If a logic 1 is not found upon this search, the second memory array is then searched in the direction perpendicular to the vehicle's heading at two grid points from the calculated position and the array position first interrogated. If either of these grid points contains a logic 1, the $X-Y$ coordinates $X_{old}, Y_{old}$ in the first memory array are changed to correspond to those $X_{st'}, Y_{st'}$ of either new position in the second memory array.

Figure 6:
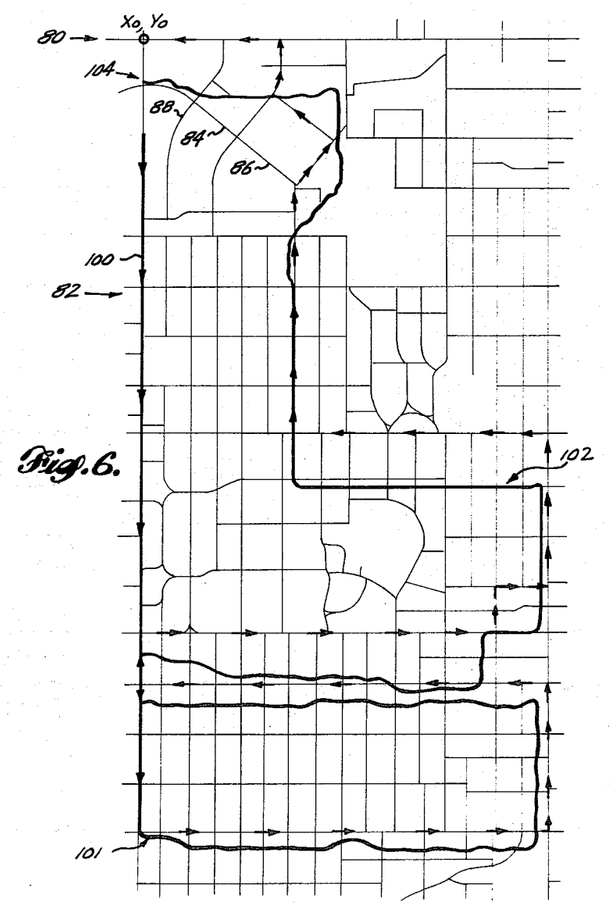
FIG. 6 is a reproduction of a map of a metropolitan area on which an X-Y plotter has traced the route of a vehicle whose location is computed using dead reckoning without compensation for accumulated errors.
Figure 7:
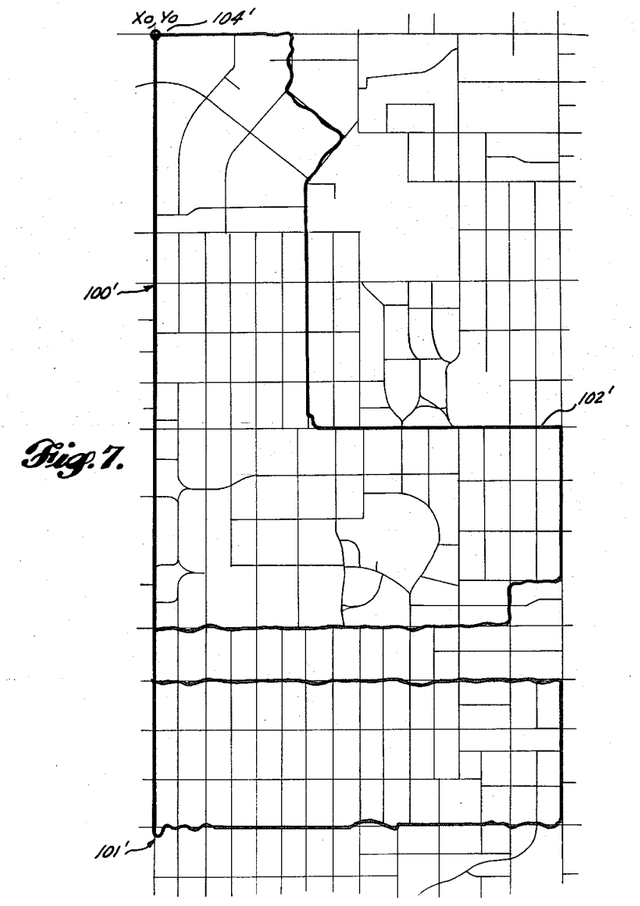
FIG. 7 is a reproduction of the same map as in FIG. 6, with the same route being traversed by the vehicle, but with dead reckoning location information being updated by the technique of this invention.

The advantage of updating in removing cumulative errors from dead reckoning location determinations can be seen by a comparison of the diagrams in FIGS. 6 and 7. FIG. 6 was prepared by tracing the output of an $X-Y$ plotter serving as display 56 upon a map of the metropolitan area. The actual route that was travelled by a vehicle along a prescribed path to and from an initial location having coordinates $X_0, Y_0$ is shown by arrows. The calulated location of the vehicle, without correction for cumulative errors, is shown by a bold line. During the initial portion of the route, the vehicle travels at a constant heading 100. However, at point 101, where the route changes direction by 90°, the accumulated distance and heading errors cause the calculated location to depart from the actual route and off a drivable surface. This location error thereafter accumulates until, at point 102, the vehicle is reported to be a full block away from the actual route. At the end of the route, the vehicle is reported at point 104 which is approximately a full block away from coordinates $X_0, Y_0$.

In FIG. 7, the vehicle location is corrected for cumulative errors using the invention. The vehicle travel is again reported at a constant heading 100'. At point 101', the reported location leaves the actual route as before. However, the update subroutine in the computer 54 immediately returns the reported location to the route of travel. As a result of the update subroutine, the reported vehicle location remains on the actual route of travel, or close thereto, for the remainder of the traverse. For example, points 102' and 104' correspond exactly with the street of travel and with the starting and ending point $X_0, Y_0$.

A 110-foot grid increment has been found sufficient for use in most metropolitan areas, inasmuch as the typical city block is 330 feet by 660 feet. With a 110-foot grid increment, the maximum error in position reporting obtainable with this system is plus or minus 55 feet. As can be seen in FIG. 6, the error obtainable in a simple traverse without updating may amount to an entire city block, or 660 feet, particularly with reference to point 102.

If the reported vehicle location and information relating to drivable surfaces cannot be correlated after the second search, no correction is made and the location reporting continues as before with the uncompensated $X$ and $Y$ coordinates being used to calculate new vehicle locations. Such an instance might occur when the vehicle is in an area in which streets are widely separated. As a result, it is likely that the actual route of travel can be determined by updating, once the vehicle returns to a more congested area.

While the invention has been described with respect to a preferred embodiment thereof, it is to be clearly understood by those skilled in the art that the invention is not limited thereto, but rather is to be bounded only by the limits of the appended claims.

What we claim is:

1. An apparatus for continuously monitoring the location of a vehicle within a predetermined area, including:
    a. a distance sensor providing an output signal for every predetermined increment of vehicle travel,
    b. a heading sensor providing an output signal proportional to vehicle heading,
    c. a first storage means containing the coordinates of the vehicle's last-known location in the area,
    d. means for periodically computing new vehicle location coordinates from the output signals of said distance and heading sensors and the last-known location coordinate contained in said first storage means and means for replacing the last-known coordinates in said first storage means with said new vehicle location coordinates,
    e. a second storage means containing the coordinates of drivable surfaces in the area,
    f. comparator means connected to said first and second storage means for comparing the coordinates contained in said first and second storage means and for providing an output signal if the coordinates in said first storage means do not correspond to any in said second storage means, and g. an update means responsive to the output signal of said comparator means to change the coordinates in said first storage means to correspond with those in said second storage means of the nearest drivable surface.

2. An apparatus as recited in claim 1, further including a display means for displaying the vehicle location coordinates in said first storage means.

3. An apparatus as recited in claim 1, wherein the vehicle includes a rotational mechanism which rotates in response to vehicle travel, and wherein said distance sensor further comprises a revolution detector providing an output pulse for every predetermined increment rotation of said rotational mechanism and means converting said output pulses into said output signal.

4. An apparatus as recited in claim 1, wherein said heading sensor includes a magnetic compass located in said vehicle.

5. An apparatus as recited in claim 1, wherein said distance and said heading sensors are located within said vehicle, and wherein said first and second storage means, said computing means, said comparator means, and said update means are located at a central station, further including a communications means for transmitting the output signals from said distance and heading sensors to said central station.

6. An apparatus as recited in claim 5, further including a digital computer located at said central station which is controlled by a stored program to provide the operations of said first and second storage means, said computing means, said comparator means, and said update means.

7. An apparatus as recited in claim 5, further including a display means located at said central station for displaying the vehicle location coordinates in said first storage means.

8. A method for continuously monitoring the location of a drivable vehicle within a predetermined geographical area, comprising the steps of:
   a. storing a last-known location for the vehicle in terms of coordinates $X_{old}$, $Y_{old}$,
   b. measuring an incremental distance $\Delta D$ travelled by the vehicle from the last-known location,
   c. measuring the heading angle of the vehicle as it travels the distance $\Delta D$,
   d. periodically computing a new location for the vehicle in terms of coordinates $X_{new}$, $Y_{new}$ according to the relations $X_{new} = X_{old} + \Delta D[\cos(\text{heading})]$ and $Y_{new} = Y_{old} + \Delta D[\sin(\text{heading})]$, and storing coordinates $X_{new}$, $Y_{new}$ as coordinates $X_{old}$, $Y_{old}$,
   e. comparing the coordinates $X_{old}$, $Y_{old}$ with a table of coordinates $X_{st}$, $Y_{st}$ corresponding to the drivable surfaces in the area,
   f. if $X_{old}$, $Y_{old}$ do not correspond to any coordinates $X_{st}$, $Y_{st}$ in the table, searching the table to find the coordinates $X_{st'}$, $Y_{st'}$ which are nearest to $X_{old}$, $Y_{old}$, and
   g. storing coordinates $X_{st'}$, $Y_{st'}$ as coordinates $X_{old}$, $Y_{old}$.

9. A method as recited in claim 8, wherein said table is searched in a direction perpendicular to the last-measured vehicle heading.

10. A method as recited in claim 8, wherein steps (e)-(g) are repeated at periodic intervals.

11. A vehicle location monitoring system for determining at a central station the locations of a plurality of vehicles within a predetermined area, comprising:
   a. a plurality of mobile units, each mobile unit being contained in one of the vehicles and each including a distance sensor providing an output signal for every predetermined increment of vehicle travel, and a heading sensor providing an output signal proportional to vehicle heading,
   b. a multiplexed communications system providing transmission of the distance sensor and heading sensor output signals from each of said mobile units to the central station,
   c. at the central station, means temporarily storing said distance and heading sensor output signals from said plurality of mobile units, a first means for storing a last-known location for each of said vehicles, means periodically computing a new location for each of said vehicles and storing the new locations in said first storage means, said computing means utilizing the locations previously stored in said first storage means and said distance and heading sensor output signals, second means for storing the locations of drivable surfaces in the area, means for comparing the location of each vehicle in said first storage means with the locations of drivable surfaces in said second storage means, and providing an output when the location of any vehicle does not correspond to a location in said second storage means, and updating means responsive to said output for changing the vehicle in said first storage means to the location of the nearest drivable surface in said second storage means.

12. A vehicle location monitoring as recited in claim 11, further including a display means at the central station which is interconnected with said first storage means for selectively displaying the locations of said plurality of vehicles.

13. A vehicle location monitoring system as recited in claim 11, wherein said multiplexed communications system includes, at the central station, a master clock providing a plurality of clock pulses, means coupled to said master clock for periodically providing a synchronization pulse to establish a reporting cycle, means transmitting said synchronization pulse to said plurality of mobile units and a demultiplexing means having said clock pulses and synchronization pulses applied thereto for establishing a plurality of successive reporting intervals during each reporting cycle to recognize the distance and heading output signals of each of said mobile units; at each of said mobile units, a multiplexing means responsive to said synchronization pulse for transmitting said distance and heading output signals to the cental station during a reporting interval assigned to the mobile unit.

14. A vehicle location monitoring system as recited in claim 13, wherein said clock pulses are supplied to said computing means so that a new location is computed for each of said vehicles once each reporting cycle.

15. A vehicle location monitoring system as recited in claim 11, further including a digital computer operating under control of a stored program to provide the operation of said first and second storage means, said computing means, said comparing means and said updating means.

16. A vehicle location monitoring system as recited in claim 15, wherein said digital computer includes a memory array functioning as said second storage means, said memory array having a plurality of positions, each position being assigned a coordinate location referenced to said area, and a plurality of data bits stored in said memory array, a data bit being contained in one of said positions only if said assigned coordinate location of said position coincides with the coordinate location of a drivable surface in the area.

17. A vehicle location monitoring system as recited in claim 16, wherein said updating means includes means searching the positions of said memory array adjacent a position having an assigned coordinate location corresponding to said last-known location stored in said first storage means for each of said vehicles, and means responsive to the detection of a data bit in one of said adjacent positions to change said last-known location in said first storage means to correspond with said coordinate location adjacent said position in said memory array.

18. A vehicle location monitoring system as recited in claim 17, wherein said searching means searches the positions in said memory array which are located perpendicular to the vehicle's heading stored in said temporary storage means.

* * * * *

PO-1050
(5/69)

UNITED STATES PATENT OFFICE
CERTIFICATE OF CORRECTION

Patent No. 3,789,198          Dated  January 29, 1974

Inventor(s) Alfred J. Henson et al

It is certified that error appears in the above-identified patent and that said Letters Patent are hereby corrected as shown below:

Column 1 lines 48 and 49  delete "45 to the sector.  Also, the sector concept may"

Column 3 line 61  change "ottput" to --output--

Signed and sealed this 7th day of May 1974.

(SEAL)
Attest:

EDWARD M.FLETCHER,JR.　　　　　　　C. MARSHALL DANN
Attesting Officer　　　　　　　　　Commissioner of Patents